(12) United States Patent
Bhumana et al.

(10) Patent No.: US 8,276,158 B2
(45) Date of Patent: Sep. 25, 2012

(54) HTTP BASED BOUNDING STORAGE SPACE PROTOCOL

(75) Inventors: Kiran K. Bhumana, Monrovia, CA (US); Jerry Alan Waldorf, II, West Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 1126 days.

(21) Appl. No.: 12/147,311

(22) Filed: Jun. 26, 2008

(65) Prior Publication Data

US 2009/0328060 A1    Dec. 31, 2009

(51) Int. Cl.
    *G06F 9/44* (2006.01)
(52) U.S. Cl. ....................................................... 719/313
(58) Field of Classification Search .................. 719/310, 719/313, 314
    See application file for complete search history.

(56) References Cited

U.S. PATENT DOCUMENTS

| | | | | |
|---|---|---|---|---|
| 4,866,707 A * | 9/1989 | Marshall et al. | | 714/749 |
| 6,430,598 B1 * | 8/2002 | Dorrance et al. | | 709/203 |
| 6,496,853 B1 * | 12/2002 | Klein | | 709/206 |
| 6,970,945 B1 * | 11/2005 | Berkman et al. | | 709/246 |
| 7,027,567 B1 * | 4/2006 | Scott et al. | | 379/88.12 |
| 7,225,230 B1 * | 5/2007 | Knoerle et al. | | 709/206 |
| 7,301,658 B2 * | 11/2007 | Henry | | 358/1.15 |
| 7,363,630 B2 * | 4/2008 | Berkman et al. | | 719/314 |
| 7,626,971 B2 * | 12/2009 | Noma | | 370/342 |
| 7,647,383 B1 * | 1/2010 | Boswell et al. | | 709/207 |
| 8,001,189 B2 * | 8/2011 | Nielsen et al. | | 709/206 |
| 2004/0242202 A1 * | 12/2004 | Torvinen | | 455/412.1 |
| 2007/0100951 A1 * | 5/2007 | Bae | | 709/206 |
| 2008/0153464 A1 * | 6/2008 | Morris | | 455/412.2 |
| 2011/0060771 A1 * | 3/2011 | Llorente et al. | | 707/812 |

* cited by examiner

*Primary Examiner* — Van Nguyen
(74) *Attorney, Agent, or Firm* — Marsh Fischmann & Breyfogle, LLP; Jon P. Deppe; Michael C. Martensen

(57) ABSTRACT

In a response based messaging system in which the reliability of the message transmission is supplemented by storing at both the source and destination a copy of the message, storage space is bounded. By including in the response to a message acknowledgement from the destination that the message has been received, the copy of the message stored at the source can be deleted. Furthermore, by including in the message an identifier of what message acknowledgement the source is expecting, the destination can delete from its storage medium any previously stored messages.

16 Claims, 5 Drawing Sheets

HTTP BASED BOUNDING STORAGE SPACE PROTOCOL

BACKGROUND OF THE INVENTION

1. Field of the Invention

Embodiments of the present invention relate, in general, to response based message systems and particularly to a bounding storage space at the source and the destination of response based message systems.

2. Relevant Background

The World Wide Web, also known as the Internet, has become a standard means by which to convey information and data. Using a standard protocol, two parties can convey information over vast distances inexpensively and efficiently. Hypertext Transfer Protocol ("HTTP") is a communications protocol for the transfer of information widely used on intranets and the Internet.

Increasingly, business data processing systems, entertainment systems, and personal communications systems are implemented by computers across networks that are interconnected by internetworks (e.g., the Internet). The Internet is rapidly emerging as the system for distributing and exchanging data. Data exchanges support applications including electronic commerce, broadcast and multicast messaging, video-conferencing, gaming, and the like. In electronic commerce (e-commerce) applications, it is important to provide a satisfying buying experience that leads to a purchase transaction. To provide this high level of service, a web site operator must ensure that data is delivered to the customer in the most timely, usable, and efficient fashion.

The Internet is a collection of disparate computers and networks coupled together by a web of interconnections using standardized communications protocols. While most Internet access is currently performed using conventional personal computers and workstations, the variety of devices that access the Internet is growing quickly and projected to continue to grow. It is expected that a variety of appliances and devices within offices, businesses, and households will support Internet connectivity in the coming years.

The Internet is characterized by its vast reach as a result of its wide and increasing availability and easy access protocols. Unfortunately, the ubiquitous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged, and/or dropped. Also, routing software and hardware limitations within the Internet infrastructure may create bandwidth bottlenecks even when the mechanisms are operating within specifications. The variable nature of the quality of service (QOS) provided by the Internet has made development and deployment of database systems that leverage the Internet infrastructure difficult.

HTTP is a request/response standard between a client and a server. A client is the end-user, the server is the web site. The client making an HTTP request—using a web browser, spider, or other end-user tool—is referred to as the user agent. The responding server—which stores or creates resources such as Hyper Text Markup Language ("HTML") files and images—is called the origin server. In between the user agent and origin server may be several intermediaries, such as proxies, gateways, and tunnels. HTTP is not constrained to using Transmission Control Protocol ("TCP") or the Internet Protocol ("IP") and their supporting layers, although this is its most popular application on the Internet. Indeed HTTP can be implemented on top of any other protocol on the Internet, or on other networks. One deficiency of HTTP is that HTTP presumes a reliable transport without providing any such basis for that presumption.

In a typical HTTP transmission, an HTTP client initiates a request and establishes a TCP connection on a host. An HTTP server waits for the client to send a request message. Upon receiving the request, the server sends back a status line and a message of its own, the body of which is perhaps the requested file, an error message, or some other information.

To overcome the reliability deficiency of HTTP transmissions, a new standard entitled "Web Service Reliability Messaging" was created. Web Services Reliable Messaging describes a protocol that allows Simple Object Access Protocol ("SOAP") messages to be delivered reliably between distributed applications in the presence of software component, system, or network failures. In other words, the ability to reliably send messages over an unreliable network.

SOAP is a protocol for exchanging Extensible Mark-up Language ("XML") based messages over computer networks, normally using HTTP/HTTPS. SOAP forms the foundation layer of the web services protocol stack providing a basic messaging framework upon which abstract layers can be built.

FIG. 1 shows a high level system depiction of Web Services Reliable Messaging as is known in the prior art. In Web Services Reliable Messaging, an Application Source ("AS") 110 wishes to reliably send messages to an Application Destination ("AD") 160 over an unreliable infrastructure. To accomplish this, and AS makes use of a Reliable Messaging Source ("RMS") 120 and a Reliable Messaging Destination ("RMD") 140. The AS 110 sends a message to the RMS 120. The RMS 120 uses the WS-Reliable Messaging ("WS-RM") protocol to transmit the message to the RMD 140. The RMD 140 delivers the message to the AD 160. If the RMS 120 cannot transmit the message to the RMD 140 for some reason, the RMS 120 must raise an exception or otherwise indicate to the AS 110 that the message was not transmitted. The AS 110 and RMS 120 may be implemented within the same process space or they may be separate components. Similarly, the AD 160 and RMD 140 may exist within the same process space or they may be separate components.

WS-RM specification deals with the contents and behavior of messages as they are being conveyed. How messages are sent from the AS 110 to the RMS 120, how they are delivered from the RMD 140 to the AD 160, whether messages are persisted on-disk or held in memory, etc. are not part of the WS-RM specification.

As implied, one issue is the persistence of a message by both the sender (AS in FIG. 1) and the recipient (AD in FIG. 1). Typically when a source sends a message, it first creates a copy of the message and stores that message in a persistent source. As is well known to one skilled in the relevant art, a persistent source or persistent memory, as it is sometimes referred to, is a memory source capable of retaining data absent a constant power source. Memory of this type establishes a state based on an input and then remains in that state, with or without power, until it is actively changed. Thus the copy of the message made by the source prior to sending the message can be recovered and resent should a loss or interruption of power occur during transmission. Similarly, the recipient of the message creates a copy of the message before it uses the content of the message. Thereafter a separate open channel is created to determine what stored messages must be maintained and which can be deleted. As the number of messages increase in volume so, too, must the number of channels to communicate what messages must be kept and which can be deleted. As message volume increases, such a duplicate process is inefficient and costly in terms of both bandwidth and storage capacity. These and other deficiencies of the prior art are addressed by embodiments of the present invention.

SUMMARY OF THE INVENTION

In a response based message system in which the reliability of the transmission of messages is uncertain, messages are stored at the source and at the destination. Over time, the storage of such messages reduces efficiency of such a response based system. To eliminate needlessly stored messages from both the persistent memory of the source and the destination, a scheme is presented to identify needlessly stored messages using the inherent responsive message of the system. Rather than opening a new channel to identify needlessly stored messages, embodiments of the present invention include identifiers in the message and response to identify to both the source and destination what messages, if any, can be safely deleted.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to an embodiment of the present invention, included with a message being sent from a source to a destination is a first identifier identifying the message that is being sent and a second identifier identifying a receipt acknowledgment expected by the source. Prior to the message being sent to the destination and consistent with reliable messaging in responsive systems, the message is stored in persistent memory in the source. Similarly, upon receipt of the message at the destination, the message is stored at the destination in a persistent memory. The bounding of this storage process is the focus of the present invention. According to an embodiment of the present invention, the first identifier associated with the message is included in the response to the source. Responsive to the source receiving the response from the destination, the source also receives an acknowledgment that the message has arrived at the destination intact. Accordingly, the message stored in the source persistent memory can be deleted safely.

Upon the issuance of the next message to the destination by the source, it, too, will include a first identifier associated with that message. However, the second identifier, which represents the message acknowledgment that the source is expecting, will no longer reflect the first message but the second message. Upon the destination receiving this second message, the destination, recognizing the second identifier, will delete any message associated with previous identifiers from its persistent memory. In other embodiments of the present invention, multiple identifiers can be sent via the message and response protocol to rid persistent memory at the source and destination of needlessly stored messages.

BRIEF DESCRIPTION OF THE DRAWINGS

The aforementioned and other features and objects of the present invention and the manner of attaining them will become more apparent, and the invention itself will be best understood, by reference to the following description of an embodiment taken in conjunction with the accompanying drawings, wherein.

Figure 1:
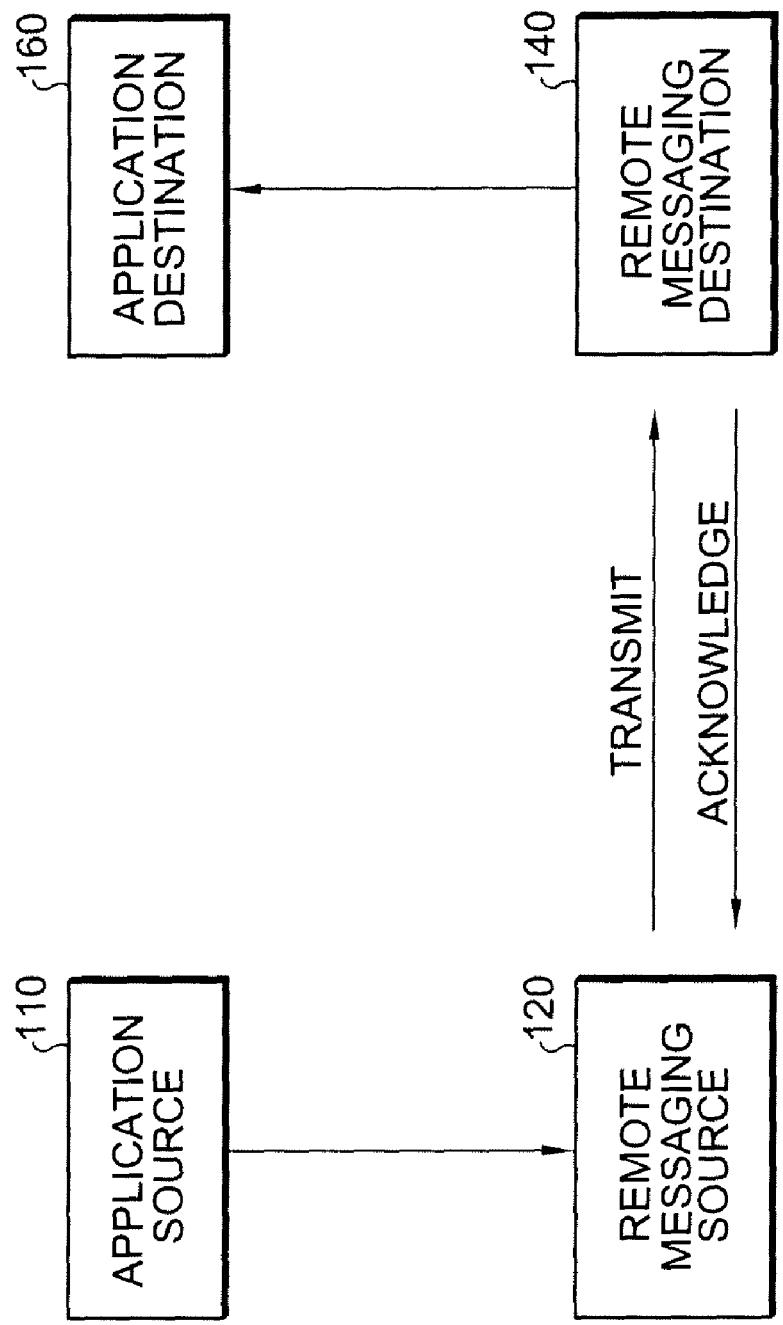
FIG. 1 shows a high level system depiction of Web Services Reliable Messaging as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Storage space at the source and destination of messages in a responsive based messaging system is bounded, according to embodiments of the present invention, by including identifiers within the message and the response. In message systems of questionable reliability, messages are stored at the source and destination until the reliability of the transfer is confirmed. According to an embodiment of the present invention, included in a message sent by a source are two identifiers. A first identifier is associated with the message while the second reflects the acknowledgment of receipt that the source is expecting from the destination. Upon the destination receiving a message, a response is sent back to the source in accordance with the responsive messaging protocol. Included in the response is an acknowledgment using the first message identifier that the message has been received at the destination. Upon the source receiving the response, and accordingly the acknowledgment, the source can safely delete the copy of the message stored in persistent memory.

Similarly, upon receipt of a message at the destination, the second identifier included with the message conveys to the destination what message acknowledgement is expected by the source. Any messages stored at the destination persistent memory prior to the expected acknowledgment can be deleted because they are no longer needed as the system will no longer send duplicates of these previous messages.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
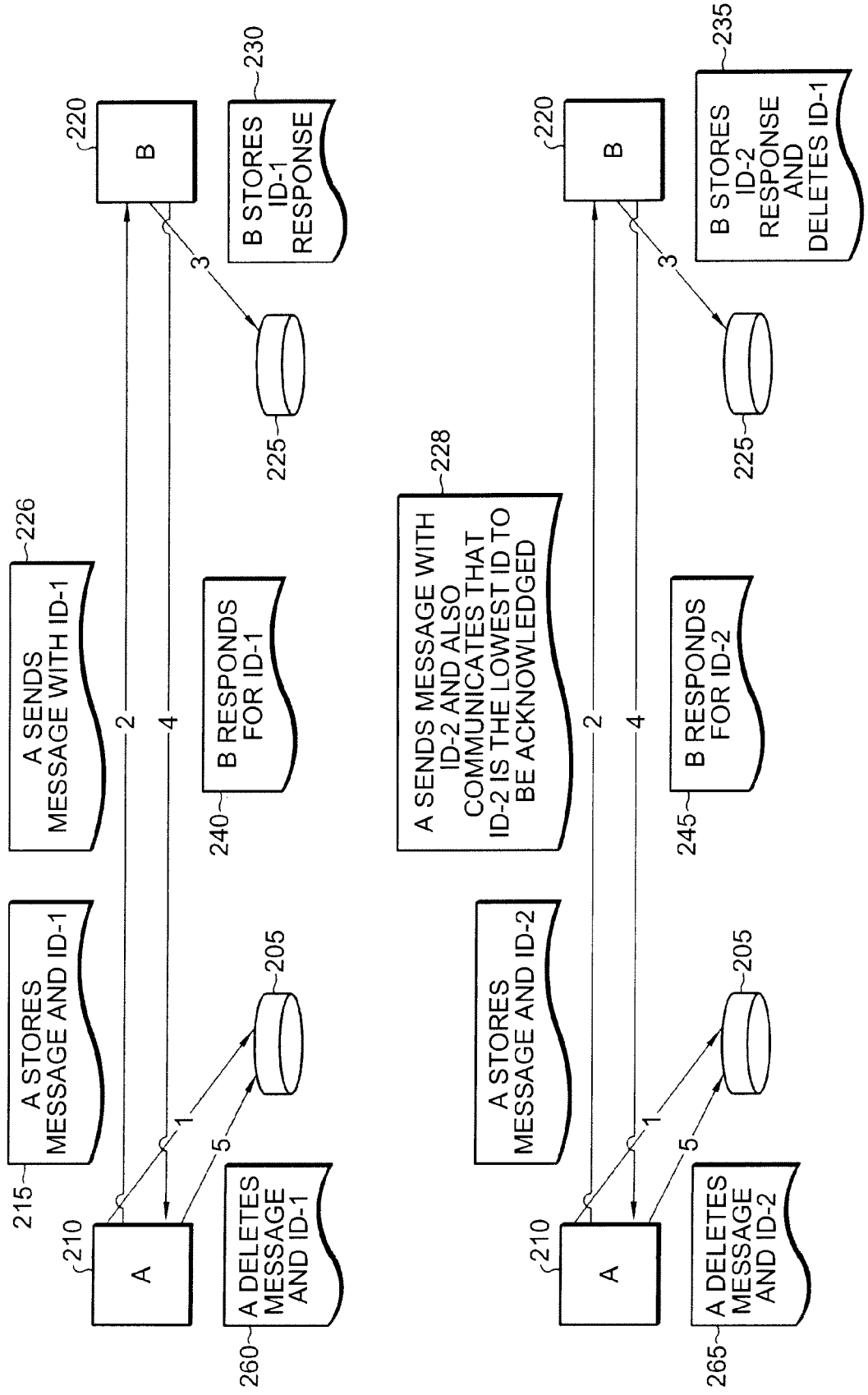
FIG. 2 shows a high level flow diagram of the movement of messages and identifiers between a source and a destination according to an embodiment of the present invention.

FIG. 2 shows a high level flow diagram of the movement of messages and identifiers between a source and a destination according to an embodiment of the present invention. A source, identified in FIG. 2 as "A" 210 sends a message to a destination, identified in FIG. 2 as "B" 220. A source 210 in a response based messaging system is one that provides an instruction, command or data to a destination yet, by design, awaits a response back to form a subsequent message. Normally this response is an acknowledgment that the first message has been received by the destination. Associated with the source 210 is also a source persistent memory 205, and similarly associated with the destination 220 is a destination persistent memory 225.

In a responsive messaging system such as HTTP, each message sent by a source 210 invokes a response by the destination 220. Other response based protocol in which the present invention is equally applicable include Session Initiation Protocol ("SIP), File Transfer Protocol ("FTP") and the like. For example, a web service client such as a personal computer with an Internet browser can identify and send a message to view and interact with a website. The website is supported and generated by a web service server. As the client asks for information from the website, the server responds. In this example the web client, the browser, is the source, and the web service server is the destination. According to an embodiment of the present invention and as shown in the upper portion of FIG. 2, a message originates at the source 210 and is stored 215 in the source persistent memory 205. Once stored, the message is sent 226 to the destination 220 via a wide area network or some other means of communication. Note that embedded in the message is an identifier associated with the message. The identifier is a packet of data coupled to the message that provides information about the data. In essence it is metadata regarding the message. The identifier can, in an embodiment of the present invention be found in the header of the message or the footer. As shown in the upper portion of FIG. 2, the message being sent from the source 210 to the destination 220 includes identifier ID-1. For the purpose of this example the identifier ID-1 is associated with a first message and identifier ID-2 is associated with a second message. Upon receipt at the destination 220 of the first message, a response is generated which is stored 230 in the destination persistent memory 225 along with the identifier, ID-1, associated with the message generating the response.

At substantially the same time that the response is stored 230 in persistent memory the response is also sent 240 to the source 210. The response to the message acts, according to an embodiment of the present invention, the acknowledgment that the message ID-1 has been successfully received at the destination. Upon receipt of the response at the source, the source 210 deletes 260 the message associated with ID-1 from the source persistent memory 205.

The lower portion of FIG. 2 represents the same process but with the understanding that a second message is being sent after a response for the first message has been received. Again the source 210 generates and stores 228 a message at the source persistent memory 205. The source thereafter sends the message to the destination 220 with two identifiers, a first identification, ID-2, associated with the second message that is being sent and a second identification, ID-2, associated with the second message but indicating that the source is expecting an acknowledgement that the second message associated with ID-2 has been received. Note that had an acknowledgment for the first message not been received by the source at the time that the second message was sent, the second message would include as the second identifier, ID-1, indicating to the destination 220 that the source 210 was expecting an acknowledgment of receipt for the first message, ID-1.

Referring again to the lower portion of FIG. 2, as the message arrives at the destination 220, a response is generated and stored 235 in the destination persistent memory 225. The arrival of the message also communicates to the destination persistent memory that the first message associated with ID-1 will no longer be duplicated or resent and thus it may be deleted from the destination persistent memory 225. Again the response is conveyed back to the source 210 acknowledging that the second message has been received at the destination 220. Upon arrival at the source 210, the acknowledgement enables the source persistent memory to delete the message associated with ID-2.

Figure 3:
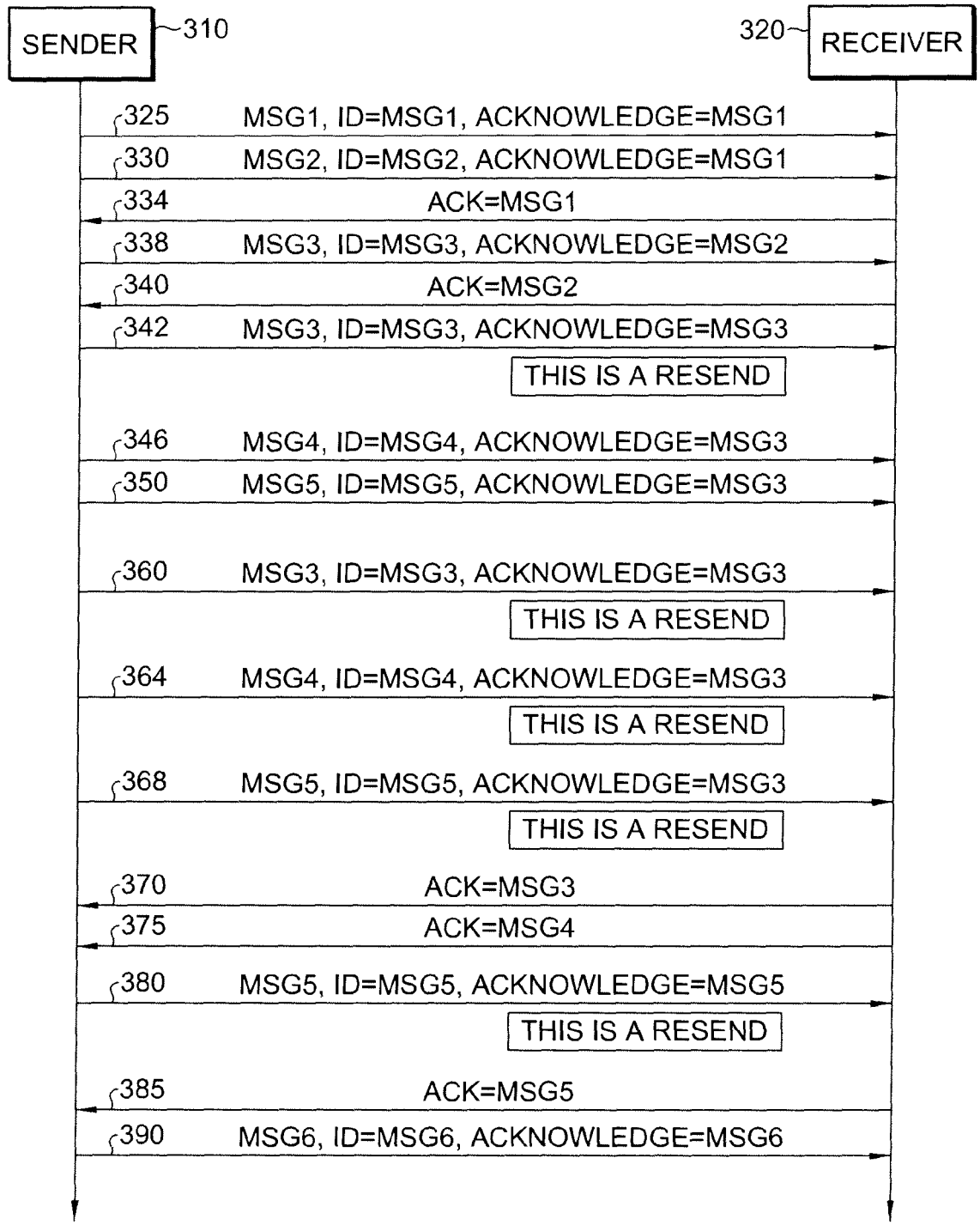
FIG. 3 is a process chart of an example exchange of messages and identifiers between a source and a destination according to an embodiment of the present invention.

FIG. 3 is a process chart of an example exchange of messages and identifiers between a source and a destination according to an embodiment of the present invention. In the embodiment shown in FIG. 3, multiple messages are being conveyed from a sender 310 to a receiver 320. The process begins 325 with a first message being sent to the receiver 320. Included is the message and its associated identifier, MSG1 and an acknowledgement expectation MSG1. The message is received at the receiver 320. Before a response is generated, a second message is generated by the sender 310 and transmitted 330 to the receiver. This transmission includes the message and its identifier MSG2 and the acknowledgment expected by the sender 310, MSG1. Thereafter the receiver 320 generates a response 334 to message one and sends it to the sender 310. The response acts as an acknowledgement that message one has been received by the receiver. Upon receipt of the response, the sender deletes message one from the sender's persistent memory.

The sender then generates and sends 338 a third message to the receiver 320. This third message includes an associated identifier MSG3 and an expected acknowledgement of message 2, MSG2. The receiver 320, upon receipt, recognizes that since the sender 310 is only expecting an acknowledgment to message two, it no longer needs to store the response to message one. Accordingly, the response to message one is deleted from the receiver's persistent memory.

A response is generated by the receiver 320 and sent 340 to the sender 310 that includes an acknowledgment that message two has been received. Upon receipt by the sender 310, message two is deleted from the sender's persistent memory. Recognizing that an acknowledgment of receipt of message three has not been received, the sender retrieves message three from memory and resends 342 the message and its associated identifier to the receiver 320. This time the expected acknowledgement by the sender 310 is message three. The receiver 320 receives the message and the expected acknowledgement and deletes message two from the persistent memory.

According to this example, no response is yet sent. However, the sender continues to send messages. A forth and fifth message are sent 346, 350 to the receiver. Each contain a message identifier and the same expected acknowledgment of message three. While in this embodiment only the highest priority of expected acknowledgements is sent to the receiver, in other embodiments, multiple expected acknowledgements may be sent to the receiver 320 via one message. Similarly, multiple acknowledgements may be sent by the receiver via one response in other embodiments.

The receiver remains dormant and fails to issue a response. Accordingly the source continues to retrieve messages from memory and resend the outstanding messages. Messages three, four and five are resent 360, 364, 368 to the receiver 320. Each resend includes the identifier associated with each message, MSG3, MSG4, MSG5 respectively, and the expected acknowledgement of message three.

After a prolonged dormant period, the receiver 320 responds and generates two responses 370, 375 acknowledging the receipt of message three and message four. Upon receipt of each response, the sender 310 deletes message three and message four respectively from persistent memory as it no longer needs to resend those messages. Again the sender 310 resends message five. This time with an expected acknowledgement of receipt of message five. Upon receipt of this message, the sender no longer needs to store the response to message three or four and thus deletes these two responses from memory.

The receiver 320 sends 385 a response to message five acknowledging its receipt allowing the sender 310 to delete message five from memory. Message six is thereafter generated and sent 390, and upon receipt by the receiver the response to message five is removed from memory. In a similar manner, the process continues.

Figure 4:
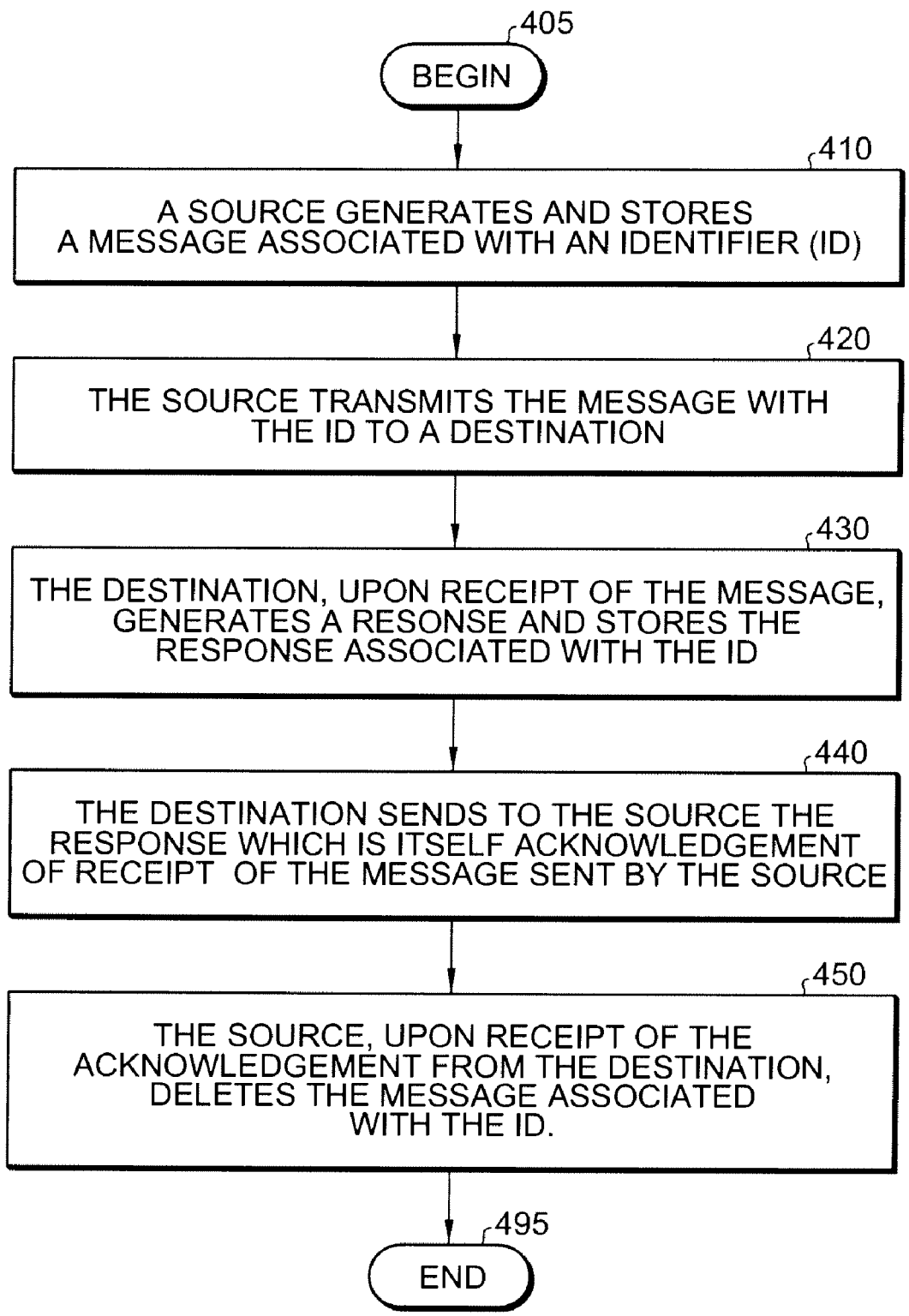
FIG. 4 is a flowchart of one method embodiment for bounding message storage space at a source according to the present invention.
Figure 5:
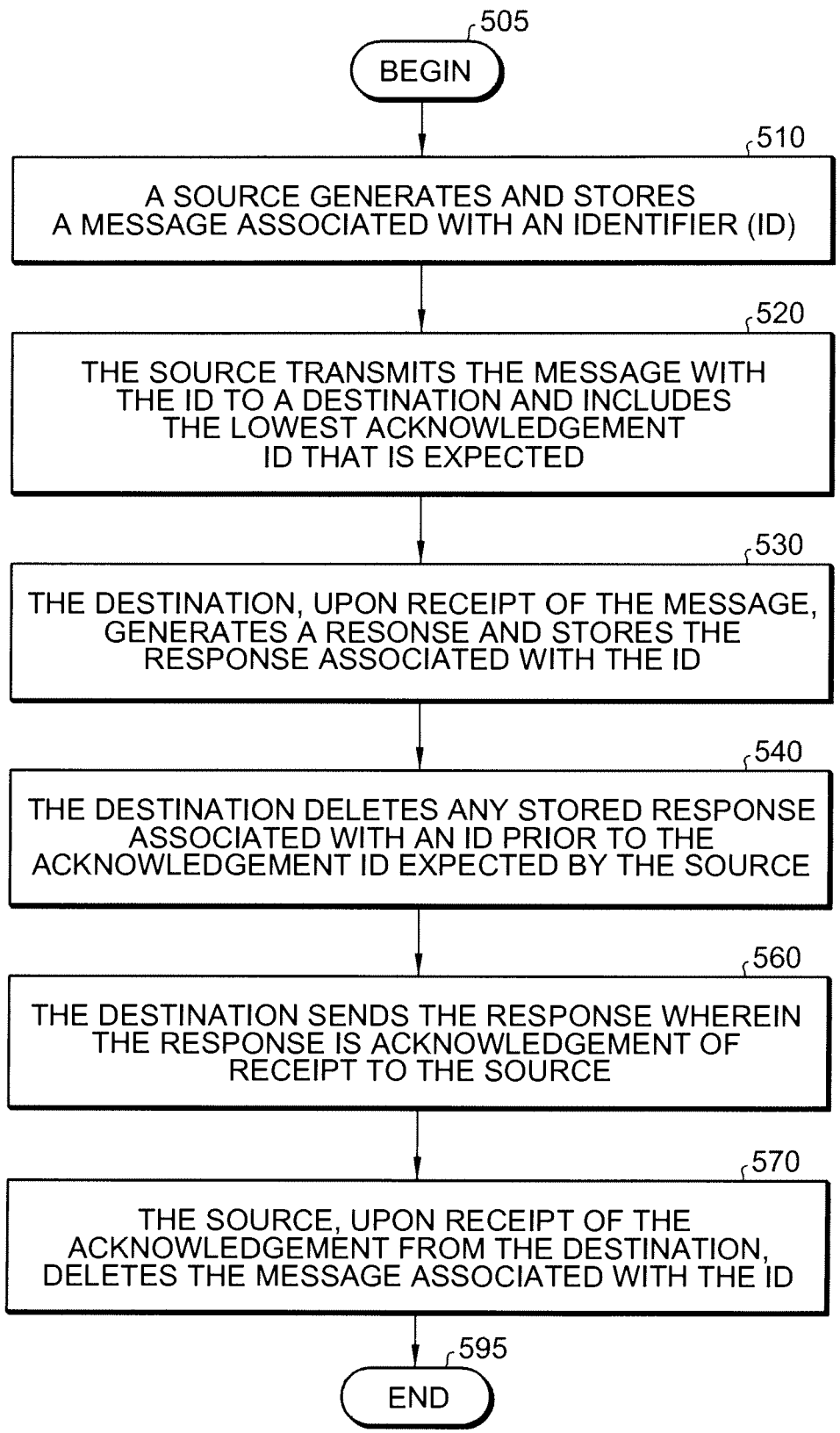
FIG. 5 is a flowchart of one method embodiment for bounding message storage space at a destination according to the present invention.

FIGS. 4 and 5 are flowcharts illustrating methods of implementing an exemplary process for bounding storage space in a response based messaging system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

FIG. 4 is a flowchart of one method embodiment for bounding message storage space at a source according to the present invention. The process begins 405 with a source generating and storing 410 a message. Associated with that message is an identifier. Thereafter the source transmits 420 the message to a destination along with its associated identifier and a separate identifier indicating what acknowledgement the source is expecting to receive from the destination. According to an embodiment of the present invention, the identifiers associated with the message and the identifier indicating what acknowledgement the source is expecting are included in the message itself. As will be appreciated by one skilled in the art, this data can be included in the metadata of the message or, according to another embodiment, in the header of the message. These and other implementation methodologies for including identifiers with the message and their response can be successfully employed. These implementation methodologies are known within the art and the specifics of their application within the context of the present invention will be readily apparent to one of ordinary skill in the relevant art in light of this specification.

Upon receipt at the destination, a response is generated and stored including the message identifier associated with the original message 430. With the sending of the response to the source, the destination acknowledges 440 the receipt of the message. Upon receipt of the response at the source, the source can eliminate 450 the stored version of the message from memory terminating 495 the process for bounding message storage space with respect to this message at the source. A similar procedure operates to remove superfluous copies of responses stored at the destination.

FIG. 5 is a flowchart of one method embodiment for bounding message storage space at a destination according to the present invention. The process begins 505 much like that of the process described above. A source generates and stores a message 510 that includes an identifier. The message is sent 520 to a destination and included in that message is the identifier associated with the message and an identifier indicating what acknowledgment the source is next expecting.

Upon receipt of the message at the destination, the destination generates and stores a response 530. At substantially the same time, the destination analyzes what acknowledgement the source is expecting and deletes 540 from memory any response that is associated with a message prior to the acknowledgement being expected by the source. By sending the next expected acknowledgement, the source is indicating that all prior responses have been received and thus the destination no longer needs to store these responses. Thereafter the destination sends 560 the response to the source ending the process 595 for bounding message storage space at the destination for this message.

Embodiments of the present invention can be implemented in software. Software programming code that embodies the present invention is typically accessed by the microprocessor from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory and accessed by the microprocessor using the bus. The techniques and methods for embodying software programming code in memory, on physical media, and/or distributing software code via networks are well known and will not be further discussed herein.

A user of the present invention may connect his computer to a server using a wireline connection or a wireless connection. (Alternatively, the present invention may be used in a stand-alone mode without having a network connection.) Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line, using a LAN card such as Token Ring or Ethernet, using a cellular modem to establish a wireless connection, etc. The user's computer may be any type of computer processor, including laptop, handheld or mobile computers; vehicle-mounted devices; desktop computers; mainframe computers; etc., having processing capabilities (and communication capabilities, when the device is network-connected). The remote server, similarly, can be one of any number of different types of computers that have processing and communication capabilities. These techniques are well known in the art, and the hardware devices and software that enable their use are readily available. Hereinafter, the user's computer will be referred to equivalently as a "workstation", "device", or "computer", and use of any of these terms or the term "server" refers to any of the types of computing devices described above.

When implemented in software, the present invention can be implemented as one or more computer software programs. The software can be implemented using an object-oriented programming language that may be designed using object-oriented modeling techniques of an object-oriented paradigm. In an embodiment of the present invention, objects that are based on this model, and which are created to represent processes of the present invention using a number of approaches or objects having similar characteristics, structured markup language documents (such as XML documents), object descriptors of an object modeling notation, or objects in an object scripting language having similar characteristics.

An implementation of the present invention may be executing in a Web environment, where software installation packages are downloaded using a protocol such as the HTTP from a Web server to one or more target computers which are connected through the Internet. Alternatively, an implementation of the present invention may be executing in other Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network as well as a multi-tier environment. Or, as stated above, the present invention may be used in a stand-alone environment, such as by an installer who wishes to install a software package from a locally-available installation media rather than across a network connection. Furthermore, it may happen that the client and server of a particular installation both reside in the same physical device, in which case a network connection is not required. (Thus, a potential target system being interrogated may be the local device on which an implementation of the present invention is implemented.) A software developer or software installer who prepares a software package for installation using the present invention may use a network-connected workstation, a stand-alone workstation, or any other similar computing device. These environments and configurations are well known in the art.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a stand-alone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

It is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer system for bounding storage space in response based messaging, the computer system comprising:

a message source wherein the message source includes a source persistent memory;

a message destination wherein the destination includes a destination persistent memory;

a machine capable of executing instructions embodied as software; and a plurality of software portions, wherein one of said software portions is configured to store, at the source persistent memory, a message;

one of said software portions is configured to send the message from the source to the destination wherein the message includes a first identifier and a second identifier, and wherein the first identifier is associated with the message being sent by the message source and the second identifier is associated with an acknowledgement expected by the message source from the message destination;

responsive to receiving at the message destination the message, one of said software portions is configured to store, at the destination persistent memory, a response to the message;

one of said software portions is configured to send to the message source an acknowledgment of receipt of the message at the message destination;

one of said software portions is configured to delete the message stored at the source persistent memory associated with the first identifier responsive to receiving acknowledgment of receipt from the message destination; and one of said software portions is configured to delete at the destination persistent memory responses to messages associated with identifiers prior to the second identifier.

2. The computer system of claim 1 wherein acknowledgment of receipt of the message is associated with the first identifier.

3. The computer system of claim 1 wherein the message is an Hypertext Transport Protocol message.

4. The computer system of claim 1 wherein the message is a web services reliable messaging message.

5. The computer system of claim 1 wherein the first identifier and the second identifier are associated with a header of the message.

6. The computer system of claim 1 wherein the first identifier and the second identifier are associated with metadata of the message.

7. The computer system of claim 1 wherein the acknowledgment is included in a response sent to the source by the destination.

8. A computer implemented method for bounding storage space in a response based messaging system, the method comprising:
   storing at a source persistent memory a message associated with a first message identifier;
   sending the message from a source to a destination wherein the message includes the first message identifier and a second message identifier, wherein the second message identifier is associated with message acknowledgments expected by the source;
   receiving at the destination the message, the first message identifier and the second message identifier;
   storing at a destination persistent memory a response to the message;
   responsive to receiving at the destination the message, sending to the source the response including an acknowledgment of receipt of the message corresponding to the first message identifier at the destination;
   responsive to receiving at the source acknowledgment of receipt of the message at the destination, deleting from the source persistent memory the message corresponding to the first message identifier; and
   responsive to receiving the second message identifier at the destination, deleting from the destination persistent memory responses associated with messages corresponding to message identifiers prior to the second message identifier.

9. The method of claim 8 wherein acknowledgment of receipt of the message includes the first message identifier.

10. The method of claim 8 wherein the message is an Hypertext Transport Protocol message.

11. The method of claim 8 wherein the message is a web services reliable messaging message.

12. The method of claim 8 wherein the first message identifier and the second message identifier are associated with a header of the message.

13. The method of claim 8 wherein the first message identifier and the second message identifier are associated with metadata of the message.

14. A non-transitory computer-readable storage medium tangibly embodying a program of instructions executable by a machine wherein said program of instructions comprises a plurality of program codes for bounding storage space in a response based messaging system, said program of instructions comprising:
   program code for storing at a source persistent memory a message associated with a first message identifier;
   program code for sending the message from a source to a destination wherein the message includes the first message identifier and a second message identifier, wherein the second message identifier is associated with message acknowledgments expected by the source;
   program code for receiving at the destination the message, the first message identifier and the second message identifier;
   program code for storing at a destination persistent memory a response to the message;
   responsive to receiving at the destination the message, program code for sending to the source acknowledgment of receipt of the message corresponding to the first message identifier at the destination;
   responsive to receiving at the source acknowledgment of receipt of the message at the destination, program code for deleting from the source persistent memory the message corresponding to the first message identifier; and
   responsive to receiving the second message identifier at the destination, program code for deleting from the destination persistent memory responses to messages associated with messages corresponding to message identifiers prior to the second message identifier.

15. The non-transitory computer readable medium of claim 14 wherein acknowledgment of receipt of the message at the destination is included in a response sent to the source by the destination.

16. The non-transitory computer readable medium of claim 14 wherein the first and second message identifier is included in metadata of the message.

\* \* \* \* \*